(12) United States Patent
Druyan et al.

(10) Patent No.: US 8,818,833 B2
(45) Date of Patent: Aug. 26, 2014

(54) METHOD AND SYSTEM FOR MANAGING SERVICE REQUESTS ACROSS MULTIPLE SYSTEMS

(75) Inventors: Alexander Druyan, Brooklyn, NY (US); Donald A. James, Round Rock, TX (US); Ching Yu Conrad Lo, Saratoga, CA (US); Arsalan K. Lodhi, Long Beach, CA (US); Fabian F. Morgan, Cambridge, MA (US); Sandra Juni Schlosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3854 days.

(21) Appl. No.: 10/076,362

(22) Filed: Feb. 14, 2002

(65) Prior Publication Data

US 2003/0154118 A1 Aug. 14, 2003

(51) Int. Cl.
*G06Q 10/00* (2012.01)

(52) U.S. Cl.
USPC ....... 705/7.15; 705/7.13; 705/7.21; 705/7.25; 700/102; 719/318

(58) Field of Classification Search
USPC .......... 705/8, 7.13, 7.15, 7.21, 7.25; 700/102; 719/318
See application file for complete search history.

(56) References Cited

U.S. PATENT DOCUMENTS

| | | | | |
|---|---|---|---|---|
| 4,922,514 | A | * | 5/1990 | Bergeron et al. .......... 379/29.01 |
| 5,168,451 | A | | 12/1992 | Bolger |
| 5,687,212 | A | * | 11/1997 | Kinser et al. ................. 379/9.03 |
| 5,751,802 | A | * | 5/1998 | Carr et al. ................ 379/201.12 |
| 5,892,900 | A | * | 4/1999 | Ginter et al. .................... 726/26 |
| 5,911,134 | A | * | 6/1999 | Castonguay et al. ............. 705/9 |
| 5,920,846 | A | * | 7/1999 | Storch et al. ...................... 705/7 |
| 5,949,977 | A | | 9/1999 | Hernandez |
| 6,615,258 | B1 | * | 9/2003 | Barry et al. ................... 709/223 |
| 6,813,278 | B1 | * | 11/2004 | Swartz et al. ................. 370/466 |
| 6,847,988 | B2 | * | 1/2005 | Toyouchi et al. ............. 709/203 |
| 6,850,613 | B2 | * | 2/2005 | McPartlan et al. ....... 379/265.02 |
| 7,013,469 | B2 | * | 3/2006 | Smith et al. ................... 719/328 |
| 7,111,318 | B2 | * | 9/2006 | Vitale et al. ................... 725/107 |

(Continued)

OTHER PUBLICATIONS

Chen, Graham; Kong, Qinzheng; Etheridge, Jaon; Foster, Paul; "Integrated TMN Service Management", Journal of Network and Systems Management, Dec. 1, 1999, pp. 469-493.*

*Primary Examiner* — Jonathan G Sterrett
*Assistant Examiner* — Stephen S Swartz
(74) *Attorney, Agent, or Firm* — Schmeiser, Olsen & Watts, LLP; Mark C. Vallone

(57) ABSTRACT

This present invention provides an efficient method and system to manage service requests across multiple service request systems. This management method involves merging all service requests from multiple systems into standard system, sorting the request according to some standard and presenting a display list of all of the requests having a common characteristic to a technician or requester. Service requests are gathered from many different backend-ticketing systems and presented to the technicians in a single logical view. Service requests gathered from each backend ticketing system are packaged in an XML document format. The efficient use of a common XML format is an efficient way to manage all service requests from all backend-ticketing systems. These service requests can be sorted by ticket open or close date/time, status, severity of problem, etc. in ascending or descending order and be presented to the technicians in a single logical view. These requests are presented in a display as a single logical view of service requests from different backend systems.

22 Claims, 5 Drawing Sheets

(56) References Cited

U.S. PATENT DOCUMENTS

| | | | |
|---|---|---|---|
| 7,472,181 B2 * | 12/2008 | Hollinger et al. | 709/224 |
| 2003/0126001 A1 * | 7/2003 | Northcutt et al. | 705/8 |
| 2003/0154118 A1 * | 8/2003 | Druyan et al. | 705/8 |
| 2004/0254757 A1 * | 12/2004 | Vitale et al. | 702/122 |

* cited by examiner

US 8,818,833 B2

METHOD AND SYSTEM FOR MANAGING SERVICE REQUESTS ACROSS MULTIPLE SYSTEMS

FIELD OF THE INVENTION

The present invention relates to a method and system to manage the handling of customer service requests and in particular to a method and system for retrieving, sorting and displaying customer service requests generated across multiple service request systems from one central service center.

BACKGROUND OF THE INVENTION

In many industries in general and service related industries in particular, it is often necessary to response to request from customers for assistance related to a product that the customer has purchased or will purchase. The respond to large volumes of customer service requests usually necessitates the scheduling of an appointment for a service provider to perform a requested service. A typical system implemented to respond to a service request usually involves receiving the request, logging the request into a service request system, sorting the request based on the type of service requested and assigning the request to service technician. The assignment of a technician will usually require the scheduling of a time to perform the requested service. In this process, providing service schedules for large numbers of service requests and relatively large numbers of service providers is typically difficult to accomplish in a cost effective manner. One reason for the lack of cost effectiveness is the difficultly involved in arranging service appointments that provide high utilization of service provider personnel without incurring inordinate scheduling time delays and/or costs.

In some service industries there are additional difficulties in scheduling in that coordination must be made with each customer to, for example, arrange for access to the customer's premises. Such coordination is particularly prevalent in utility and telecommunication industries. It is typical when such coordination is required, that each customer requesting service is given a service time interval within which the customer's requested service is to be addressed and resolved. Thus, a customer is required to be accessible during the service time interval for a service provider to perform the requested service.

It is also a common practice in industries providing such service time intervals in response to customer service requests that service time intervals are typically larger than the estimated time to perform the requested service. This strategy provides additional flexibility in scheduling service providers in that there is allowance or flexibility for schedule changes without the need for additional contacts with customers and rearrangement of service appointments. However, to provide customer satisfaction, it is also preferred that the service time intervals agree or overlap as much as possible with preferred service request times given by customers. Thus, accomplishing the two goals of effectively scheduling service providers and also accommodating the preferred service times given by customers becomes even more difficult.

Previous attempts to satisfy both the goal of efficient scheduling for service providers and the goal of accommodating customer preferred service times have focused on obtaining all or substantially all customer service requests before formulating a schedule for service providers. Thus, customers with service requests are typically contacted at some later time after the initial customer request and provided with a time, which may or may not correspond with any customer preferred time interval for the service request. This strategy, however, has the disadvantages of: (a) increasing scheduling overhead in that customers must be re-contacted which may involve multiple contact attempts for a single service request; (b) necessitating further inconvenience for customers requesting service; and (c) typically requiring an early cut off date wherein no further customer requests are taken for certain dates not yet having service provider schedules.

In addition to scheduling concerns, some companies receive service request from multiple locations and multiple service request systems such as "Help Desk or CRM". Many service technicians receive requests from these multiple systems. However, a technician at any time may only check for requests from one system. If this is the case, requests for a technician from other systems could go unattended for extended periods of time. A problem with multiple systems is that many of these systems may have different formats that require different procedures for a technician to retrieve service requests. The technician would need to access the particular ticketing system to determine if there were any service tickets assigned to them from that system.

In the typical procedure for handling a service request, an initial technician would gather the information concerning the problem from the customer. The initial technician would then assign the problem/request to a technician to address for the consumer. The assigning of that task would be in the form of a ticket that the technician. In an example, if a customer were experiencing a problem with a communication network, the initial receiver of the request would create a service ticket for that problem and assign this ticket to a technician. The service ticket would be in the format of the system that created the ticket. Different service tickets can also be created on different systems based on the nature of the problem or service request.

Thus, it would be advantageous to have the capability to merge all service from various service request systems into one central service request site. From that site, the service technicians could retrieve requests from any service request system, which receives requests for that technician.

SUMMARY OF THE INVENTION

It is an objective of the present invention to present a single display containing service request tickets assigned to a service technician from multiple service request ticketing systems.

It is a second objective of the present invention to provide a method and system that can process service requests from multiple service request systems.

It is a third objective of the present invention is to provide a common format for service requests from multiple service request systems.

It is a fourth objective of the present invention to provide a method and system that merges service requests from multiple service request systems into on service request system.

It is a fifth objective of the present invention to provide a method and system that can sort the service requests received from the various service request systems based a set of predetermined parameters.

It is a sixth objective of the present invention to provide a method and system that can display a sorted list of service request for a particular technician.

This present invention provides an efficient method and system to manage service requests across multiple service request systems. This management method involves merging all service requests from multiple systems into standard system, sorting the request according to some standard and presenting a display list of all of the requests having a common characteristic to a technician or requester. Service requests are gathered from many different backend-ticketing systems and presented to the technicians in a single logical view. Service requests gathered from each backend ticketing system are packaged in an XML document format. The efficient use of a common XML format is an efficient way to manage all service requests from all backend-ticketing systems. These service requests need to be sorted by ticket open or close date/time, status, severity of problem, etc. in ascending or descending order and be presented to the technicians in a single logical view. These requests are presented in a display as a single logical view of service requests from different backend systems.

This present invention provides an efficient way to manage service requests across multiple XML documents and present a single logical view of service requests from different backend systems. When a technician needs to access service requests assigned to him, the request is sent to multiple backend legacy ticketing systems. Service requests received from each backend system are packaged into a XML document and each service request is a child node of the XML document. Multiple XML documents are received from multiple systems. All XML documents are merged into a master XML documented by concatenating child nodes (service requests) to the master XML document. In order to sort the merged XML document efficiently, an integer array (sort map) is created to index the sort order of the master XML document. There is a sort map for each required data type such as sort by Date/Time, Priority, Severity, Contact Name, Telephone number, etc.

The system of the present invention contains a set of adapters that interface with multiple service request systems. These adapters convert the requests from these systems into a common format. The converted requests from these adapters are stored in a memory location. A sort module then can perform a sort on the stored requests. The search is performed by initially creating a sort map based on the particular sorting requirement. The resulting sort is then displayed to the technician.

The present invention provides several advantages over the current techniques for processing service tickets. By using the method of this invention, the process of sorting by ascending or descending order of the same data type can be easily achieved by accessing the sort map from the top or from the bottom of the array. In addition, rather than creating a new XML document each time the user requests for the view, with this invention there is only a need for the master XML document and one integer array. This method also provides fast response time and reduces memory space. Another benefit of the present invention is that the sort map is created when the user requests a view. The specific sort remains in the memory until there is no longer any need for the master XML document. Therefore, if the user requests the same view, the same sort map will be used again. Another feature of the invention is the creation of a new integer array when the user selects a different data type sort. No new array is created if the user selects to sort the same data type as a previous and existing sort. Lastly, the XSLT sorting function is available for sorting. To use XSLT sorting, a new XML document is generates every time. It is slower, inefficient, and CPU intensive.

The present invention also provides a cache memory to store the sorted lists of the merged service tickets. This cache memory will store an entire sorted list. In realty, many systems cannot display large numbers of service tickets. Therefore, a technician will only review a limited number of tickets at one time. The remaining tickets on this list continue to be stored in the cache memory. The next time the technician wants to get service tickets assigned to them, the cache memory will provide a portion of the sorted listed that is still in the cache.

DETAILED DESCRIPTION OF THE INVENTION

Figure 1:
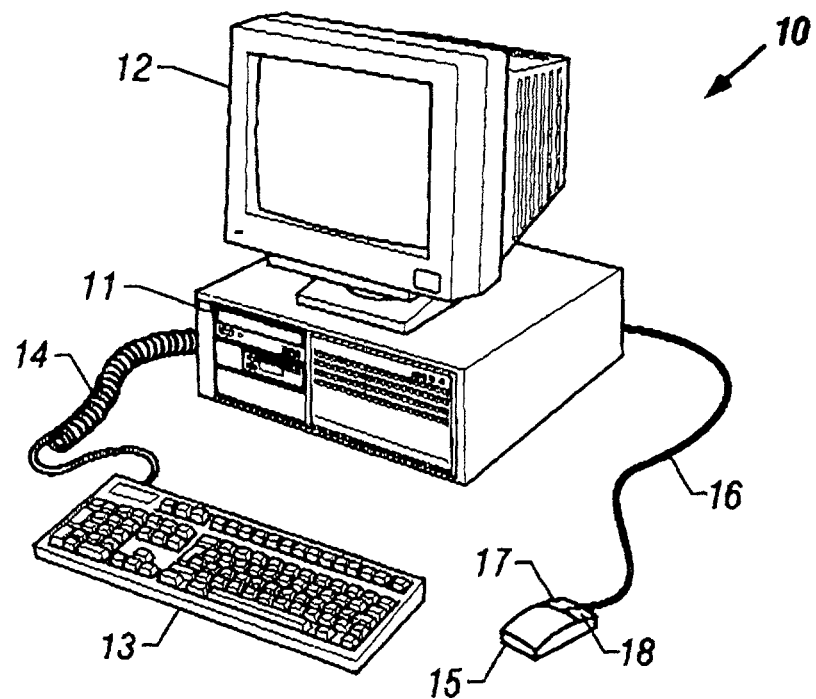
FIG. 1 depicts data processing equipment a system that can be utilized to implement the present invention.

The system of the present invention has several components, which can include: a personal computer system, a global computing network, and a browser program. With reference now to FIG. 1, there is depicted a pictorial representation of data processing system 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The personal computer may operate in a networked environment using logical connections to one or more remote computers, such as a remote computer. The remote computer may be another personal computer, a server, a router, a network PC, a peer device or other common network node, and typically includes many or all of the elements relative to a conventional personal computer. The logical connections depicted include a local area network (LAN) and a wide area network (WAN), Such networking environments are commonplace in offices, enterprise-wide computer networks, intranets and the Internet.

As mentioned, the method of the present invention may be implemented in a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
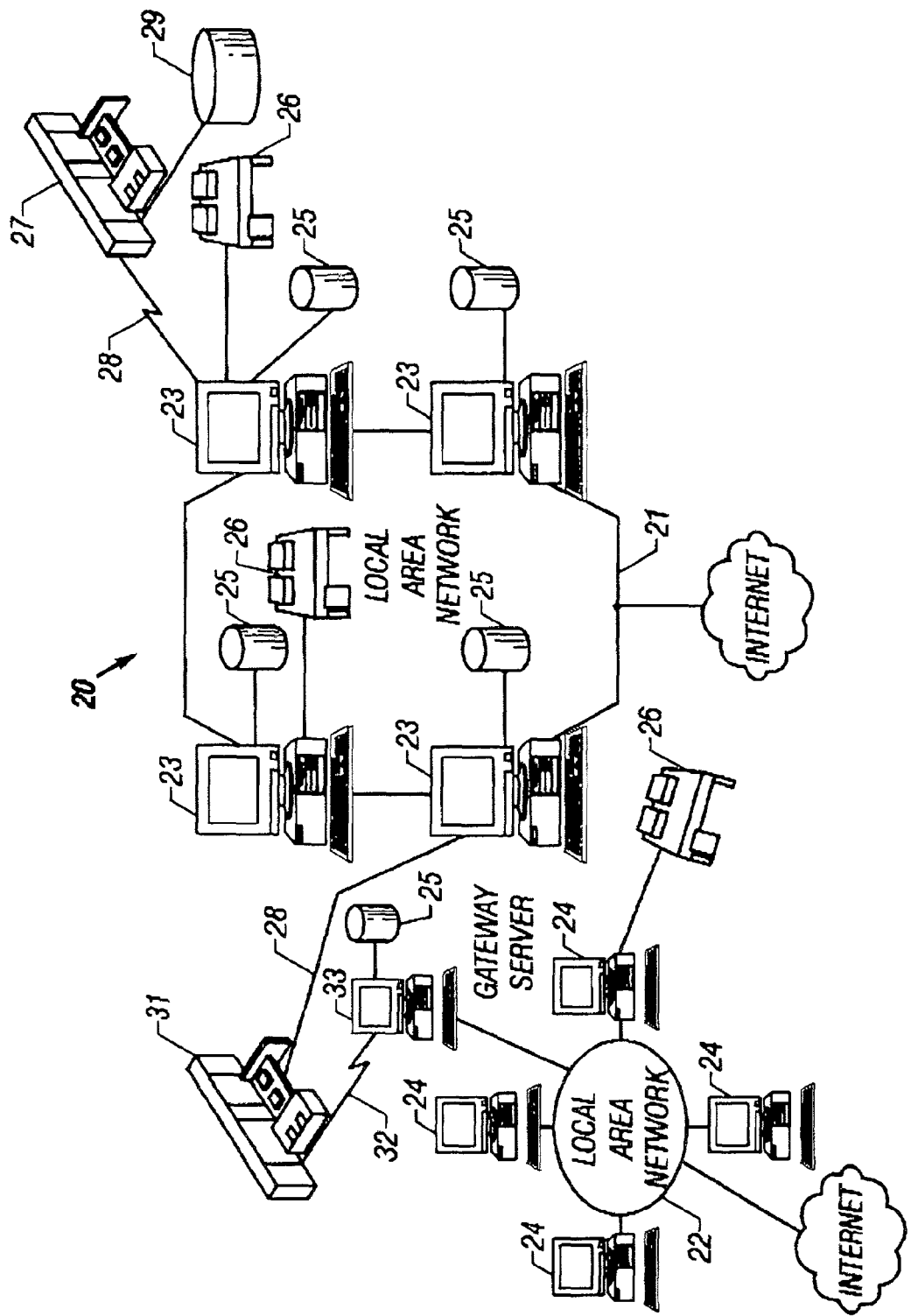
FIG. 2 is a diagram of a computer network over which messages and transactions may be transmitted.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS) that serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

A user can communicate with this ticket request system via a browser. Browsers are computer programs that allow users to move easily from one resource to another and make convenient the viewing and maneuvering of HTML documents on the web. Users generally navigate through the WWW using an application known as a WWW browser client. The browser presents formatted text, images, sound, or other objects, such as hyperlinks, in the form of a WWW page on a computer screen. Browsers provide a graphical user interface with standard point-and-click navigation methods. These browsers support HTML files. The user can click on a hyperlink with the cursor to navigate to other WWW pages on the same source computer, or server, or on any other WWW server on the network. The WWW links exist across the global Internet to form a large-scale, distributed, multimedia knowledge base that relates words, phrases, images, or other information. Smaller-scale implementations may occur on enterprise internets. Typical browsers allow users to attempt to access any URL. Sometimes browsers either employ, or are served by proxies, which utilize, firewalls. Firewalls restrict access to certain URLs.

The service request tickets can be converted into a common format such as an XML format. XML is subset of the Standard Generalized Markup Language (SGML) defined in ISO standard 8879:1986 that is designed to make it easy to interchange structured documents over the Internet. XML files always clearly mark where the start and end of each of the logical parts (called elements) of an interchanged document occurs. XML restricts the use of SGML constructs to ensure that fallback options are available when access to certain components of the document is not currently possible over the Internet. It also defines how Internet Uniform Resource Locators can be used to identify component parts of XML data streams. XML allows users to: 1) bring multiple files together to form compound documents; 2) identify where illustrations are to be incorporated into text files, and the format used to encode each illustration; 3) provide processing control information to supporting programs, such as document validators and browsers; 4) add editorial comments to a file.

Figure 3:
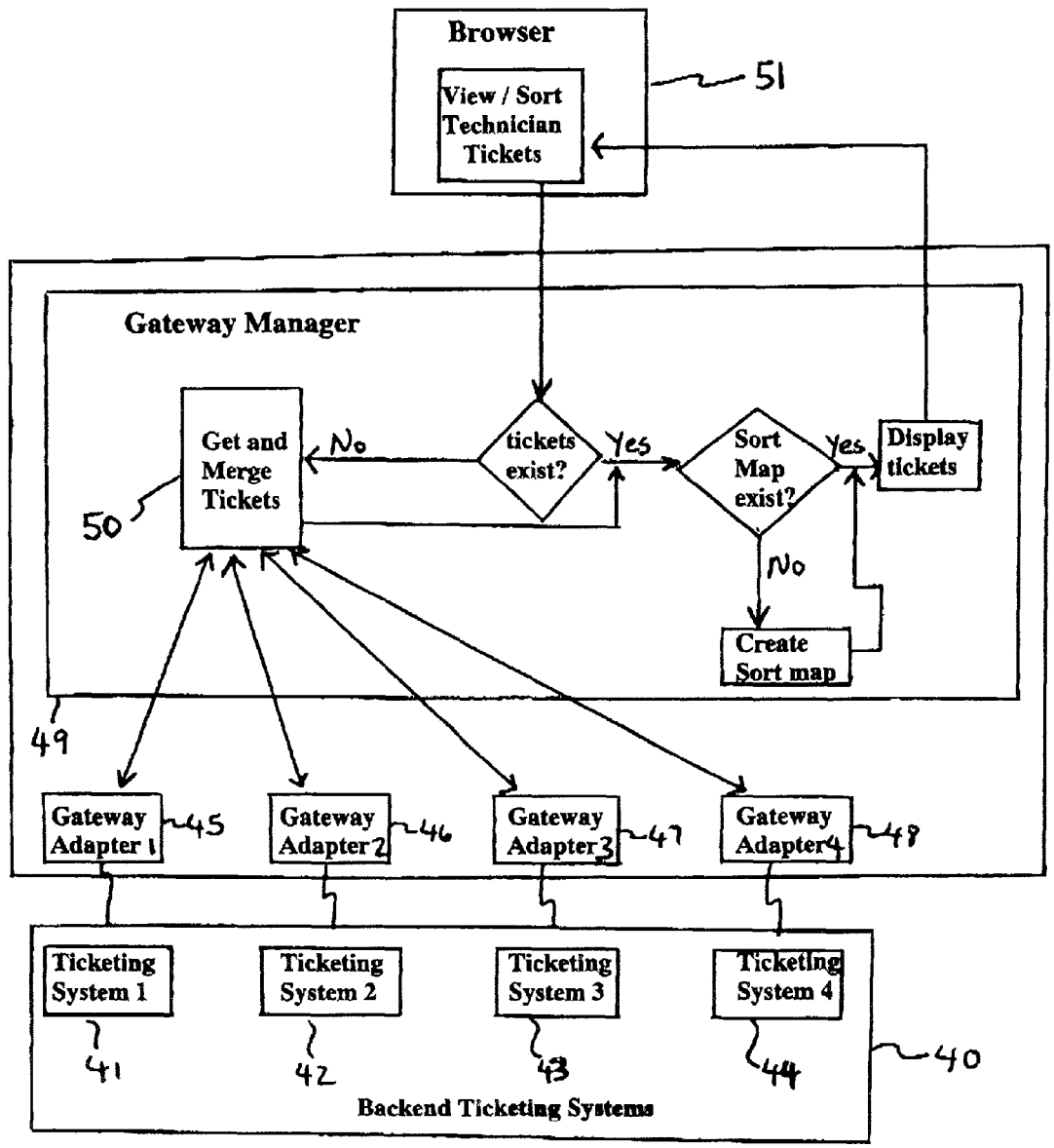
FIG. 3 is an overview of the operation of the method and architecture of the system of the present invention.

FIG. 3 illustrates the configuration of the system of the present invention. In this system, there is backend-ticketing system 40. This system contains multiple ticketing systems 41, 42, 43, and 44 that receive service request. As mentioned, these systems can have various formats such as a single connections database format or a Java database format. For instance, system a 41 can be a Help Desk system has a specific method for accessing that system. System 42 can be CRM system that has a java format used to access that system. Each backend ticketing system connects to a gateway adapter 45, 46, 47, and 48. These gateway adapters are designed such that they can communicate with a particular backend ticketing system and with the gateway manager 49. Each gateway adapter contains a processing unit and software to enable that adapter to convert the ticket request from the specific format of the backend ticketing system connected to that adapter into a generic format for processing by the gateway manager. The gateway adapters also convert commands from the gateway manager into the format of the specific backend ticketing systems. Also included in the gateway manager is a cache memory. This cache memory can reside in the gateway ticket interface 50. This interface retrieves tickets from the gateway adapters and ticketing systems. The cache memory will contain the merge lists from the multiple ticketing systems and the sorted lists. A browser 51 provides an interface to the system for the technician. FIG. 3 also contains a general flow diagram of the operations of the present invention, which is illustrated in FIG. 4.

Figure 4:
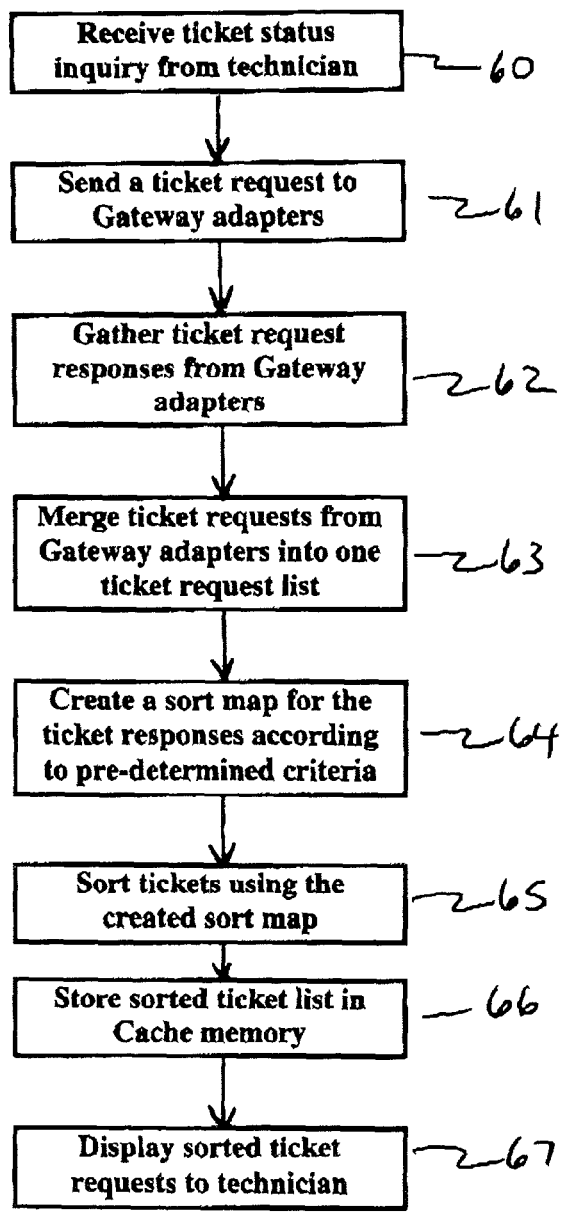
FIG. 4 is a flow diagram of the method of the present invention.

Referring to FIG. 4, there is a flow diagram of the method of the present invention. A technician can request a list of service tickets that have been assigned to that technician. In the initial step 60, the gateway manager 49 receives an inquiry from a technician via a browser connection. The gateway interface then generates a request and sends it to each backend ticketing system in step 61. In step 61, the requests from the gateway manager pass through the gateway adapters where the adapters convert the requests into a compatible format for the specific backend ticketing system connected to the various adapters. The backend ticketing systems 41, 42, 43, and 44 receive the request and generate lists of service tickets for the identified technician making the inquiry. These backend ticketing systems send these lists through the gateway adapter and back to the gateway manager. In step 62, the gateway interface 50 gathers these service request tickets from the gateway adapters. The gateway manager receives these lists, and in step 63, and begins to merge the information contained in the various lists into one main list of request from all of the backend ticketing systems. Once the gateway interface has merged the list of request, the next step 64 is to sort this list. The reason for the ticket sort is that in many instances the amount of information received and merged by the gateway manager is such that it may not be feasible or practical for the technician to view the entire number of service tickets at one time. Therefore, this volume of service tickets is further processed to generate a priority among the list of tickets. The ticket sort can be by any predetermined criteria. The criteria could be a deadline date on an actual ticket, the type of service request or the date of the request. In step 64, a sort map is created for the retrieved ticket responses from the ticketing systems. Once there is a sort map, step 65 sorts the ticket requests using the created sort map. The sorted tickets are stored in the cache memory, in step 66. At this point, step 67 will display a segment of the tickets in the sorted list to the requesting technician. In an example, if the sorted list contained 10 tickets, but the browser could only view five at one time, the display step 67 may only retrieve 5 tickets per display. Following the review of the first five tickets, the next five tickets will be retrieved for review by the technician. The display will show the ticket requests across all of the various ticketing systems.

As mentioned, these ticket lists reside in a cache memory. This memory is smaller and faster then a conventional memory. The purpose of the cache is to reduce the number of queries made by the gateway manager to the ticketing systems. When a technician makes a service ticket inquiry, the first step is to search the cache memory for any request for this technician. If the cache contains tickets for the technician, these tickets are displayed to the technician. If the cache does not have any tickets for that technician, the gateway manager will send a request via the gateway adapter to the ticketing systems. In addition, if a long (determined) period elapses, the cache will refresh the tickets in that memory. The cache can also retrieve new ticket requests as part of the main method of this invention.

Figure 5A:
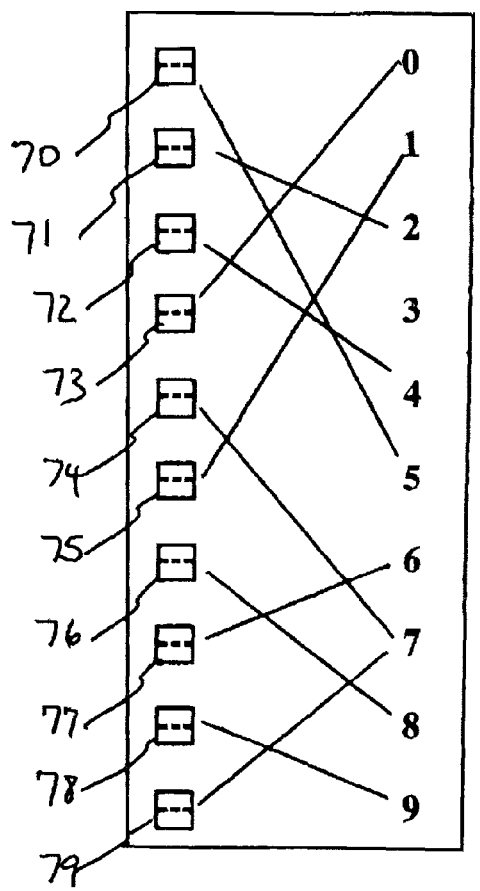
FIGS. 5*a* and 5*b* are illustrations of the merge and sorting functions of the present invention.
Figure 5B:
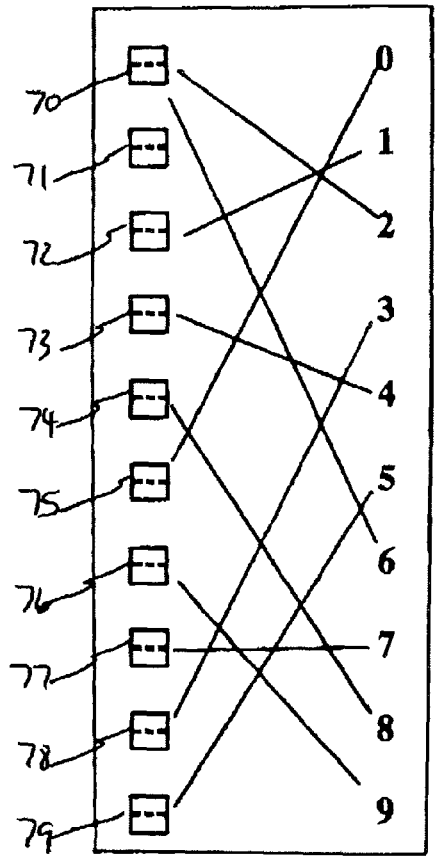

A key component of the present invention is the sorting procedure for the retrieved service tickets. Referring to FIGS. 5a and 5b, two sort schemes for the tickets are shown. As previously mentioned, the retrieved service tickets are in an XML format. As a result, it is very difficult to rearrange these ticket records during a sorting procedure. In order to perform the sort, there is an array of integer pointers created, one for each retrieved ticket. As the sorting procedures occur, the pointers for each integer are rearranged as a result of the sort. FIG. 5a shows 10 retrieved tickets 70 through 79 from the ticketing system. The sort routines are one-to-one comparisons of two tickets. If the sort is from the lowest to the highest, ticket 70 is compared with ticket 71. In this comparison, pointer 0 will point to the service ticket, which is lower between 70 and 71. If ticket 70 is less than 71, then ticket 70 is compared to ticket 72 in the same manner. Pointer 0 may then be reappointed to ticket 70 based on the results of this second comparison. This procedure continues for ticket in the list. As the order of the tickets change as a result of the sort, the pointers also change. However, the physical order of the ticket request does not change. In FIG. 5a, the sort may be to sort by earliest request submission. The fourth ticket 73 in the order may have the earliest ticket submission date. The zero pointer points to the ticket 73 that will the first in the display to the technician. There can be multiple sort results stored in the cache memory. FIG. 5b shows a sort based on different criteria such as ticket request location or type of service requests. In this drawing, the sixth ticket 75 has the top priority.

It is important to note that while the present invention has been described in the context of a fully functioning data processing system, those skilled in the art will appreciate that the processes of the present invention are capable of being distributed in the form of instructions in a computer readable storage medium and a variety of other forms, regardless of the particular type of medium used to carry out the distribution. Examples of computer readable storage media include media such as EPROM, ROM, tape, floppy disc, hard disk drive, RAM, and CD-ROMs.

Having thus described the invention, what we claims as new and desire to secure by Letters Patent is set forth in the following claims.

We claim:

1. A method for displaying a list of service requests from multiple service request systems on a single display, said method comprising:
   a computer processor receiving a service inquiry from a browser to which a technician is interfaced at a computer comprising the browser, said computer processor being comprised by a gateway manager, said service inquiry requesting a list of services assigned to the technician for being performed by the technician;
   in response to said receiving the service inquiry, said processor formulating and sending a service request status message to a plurality of service ticketing systems, said service request status message requesting service tickets specifying the services assigned to the technician;
   after said sending the service request status message, said processor receiving the service tickets from the service ticketing systems, each service ticket specifying a different service of the services assigned to the technician;
   said processor merging the received service tickets into a response list of tickets;
   said processor sorting the tickets in the response list by sort parameters to generate multiple sorted ticket request lists; and
   said processor storing the multiple sorted ticket request lists in a cache memory at the gateway manager for subsequent display to the technician of a sorted ticket request list of the multiple sorted ticket request lists, wherein the multiple sorted ticket request lists are concurrently stored in the cache memory.

2. The method of claim 1, said method further comprising:
   before said sending the service request status message, said processor converting the service status request message to a format that is specific for each service ticketing system.

3. The method of claim 1, said method further comprising:
   said processor converting the received service tickets into a common format, wherein said merging results in the response list being in the common format.

4. The method of claim 1, said method further comprising:
said processor determining an elapsed time since a last inquiry by the technician; and
said processor resetting the sorted ticket lists in the cache after a predetermined time period has expired.

5. The method of claim 4, wherein said resetting comprises retrieving additional tickets for the ticketing systems.

6. The method of claim 3, wherein the common format is an XML format.

7. The method of claim 6, wherein said sorting comprises:
creating a different integer array of pointers for each sort parameter to index a sort order of the tickets in the response list for each sort parameter, wherein each pointer in each integer array points to a ticket in the response list, and
rearranging the pointers in each integer array as the tickets are rearranged in the response list for each sort parameter.

8. The method of claim 1,
wherein the sort parameters consist of a first sort parameter and a second sort parameter,
wherein the multiple sorted ticket request lists consist of a first sorted ticket request list and a second sorted ticket request list, and
wherein said sorting comprises generating the first sorted ticket request list whose tickets are sorted according to the first sort parameter and generating the second sorted ticket request list whose tickets are sorted according to the second sort parameter.

9. The method of claim 8, wherein the first sort parameter consists of ticket request location, and wherein the second sort parameter consists of type of service requested.

10. The method of claim 8, wherein the first sort parameter consists of ticket submission date, and wherein the second sort parameter consists of severity of problem to which service is directed.

11. The method of claim 1, said method further comprising:
displaying to the technician the sorted ticket request list by displaying sequential segments of tickets in the sorted ticket request list, one segment at a time.

12. A computer program product, comprising a computer readable storage medium having a computer readable instructions stored therein, said instructions configured to be executed by a computer processor of a gateway manager to implement a method for displaying a list of service requests from multiple service request systems on a single display, said method comprising:
receiving a service inquiry from a browser to which a technician is interfaced at a computer comprising the browser, said service inquiry requesting a list of services assigned to the technician for being performed by the technician;
in response to said receiving the service inquiry, formulating and sending a service request status message to a plurality of service ticketing systems, said service request status message requesting service tickets specifying the services assigned to the technician;
after said sending the service request status message, receiving the service tickets from the service ticketing systems, each service ticket specifying a different service of the services assigned to the technician;
merging the received service tickets into a response list of tickets;
sorting the tickets in the response list by sort parameters to generate multiple sorted ticket request lists; and
storing the multiple sorted ticket request lists in a cache memory at the gateway manager for subsequent display to the technician of a sorted ticket request list of the multiple sorted ticket request lists, wherein the multiple sorted ticket request lists are concurrently stored in the cache memory.

13. The computer program product of claim 12, said method further comprising:
before said sending the service request status message, said processor converting the service status request message to a format that is specific for each service ticketing system.

14. The computer program product of claim 12, said method further comprising:
converting the received service tickets into a common format, wherein said merging results in the response list being in the common format.

15. The computer program product of claim 12, said method further comprising:
determining an elapsed time since a last inquiry by the technician; and
resetting the sorted ticket lists in the cache after a predetermined time period has expired.

16. The computer program product of claim 15, wherein said resetting comprises retrieving additional tickets for the ticketing systems.

17. The computer program product of claim 14, wherein the common format is an XML format.

18. The computer program product of claim 17, wherein said sorting comprises:
creating a different integer array of pointers for each sort parameter to index a sort order of the tickets in the response list for each sort parameter, wherein each pointer in each integer array points to a ticket in the response list, and
rearranging the pointers in each integer array as the tickets are rearranged in the response list for each sort parameter.

19. The computer program product of claim 12,
wherein the sort parameters consist of a first sort parameter and a second sort parameter,
wherein the multiple sorted ticket request lists consist of a first sorted ticket request list and a second sorted ticket request list, and
wherein said sorting comprises generating the first sorted ticket request list whose tickets are sorted according to the first sort parameter and generating the second sorted ticket request list whose tickets are sorted according to the second sort parameter.

20. The computer program product of claim 19, wherein the first sort parameter consists of ticket request location, and wherein the second sort parameter consists of type of service requested.

21. The computer program product of claim 19, wherein the first sort parameter consists of ticket submission date, and wherein the second sort parameter consists of severity of problem to which service is directed.

22. The computer program product of claim 12, said method further comprising:
displaying to the technician the sorted ticket request list by displaying sequential segments of tickets in the sorted ticket request list, one segment at a time.

* * * * *